Jan. 19, 1971  F. M. WOOD  3,555,887
APPARATUS FOR ELECTROACOUSTICALLY INSPECTING TUBULAR MEMBERS
FOR ANOMALIES USING THE MAGNETOSTRICTIVE EFFECT
AND FOR MEASURING WALL THICKNESS
Filed Sept. 19, 1967  4 Sheets-Sheet 1

Fenton M. Wood
INVENTOR

BY Arnold, Roylance,
Kruger & Durkee
ATTORNEYS

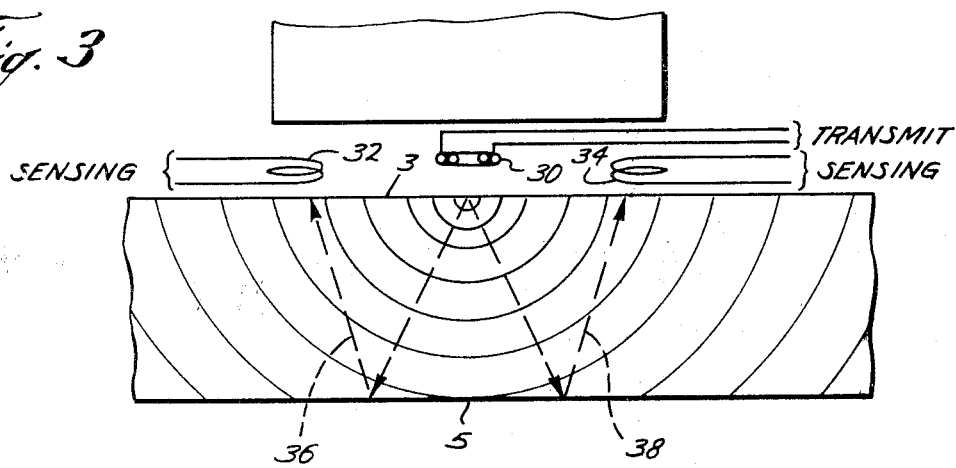
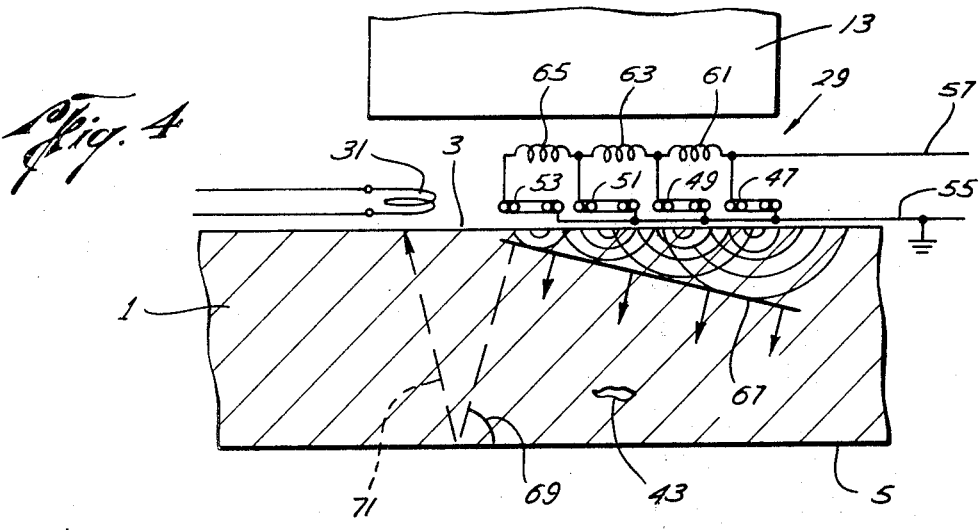
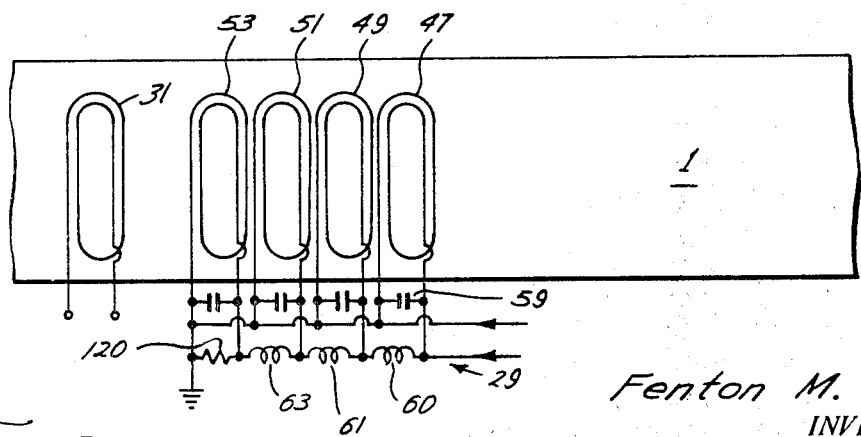

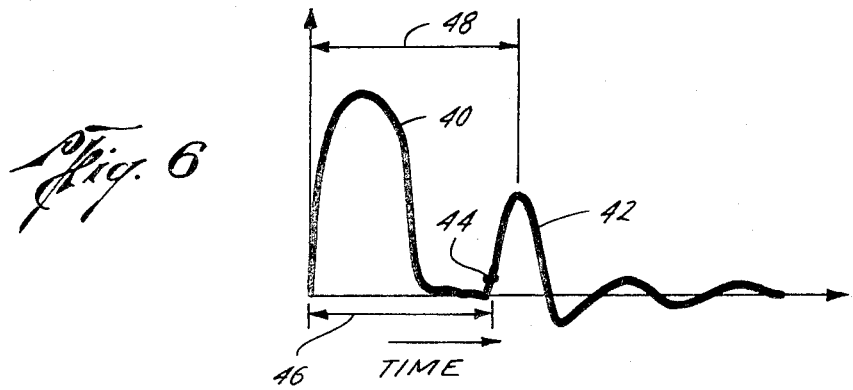
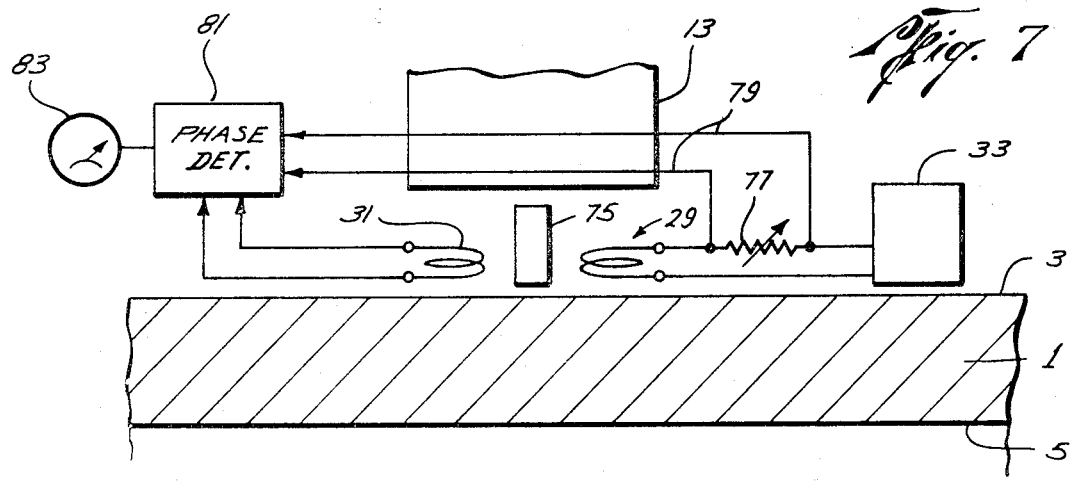
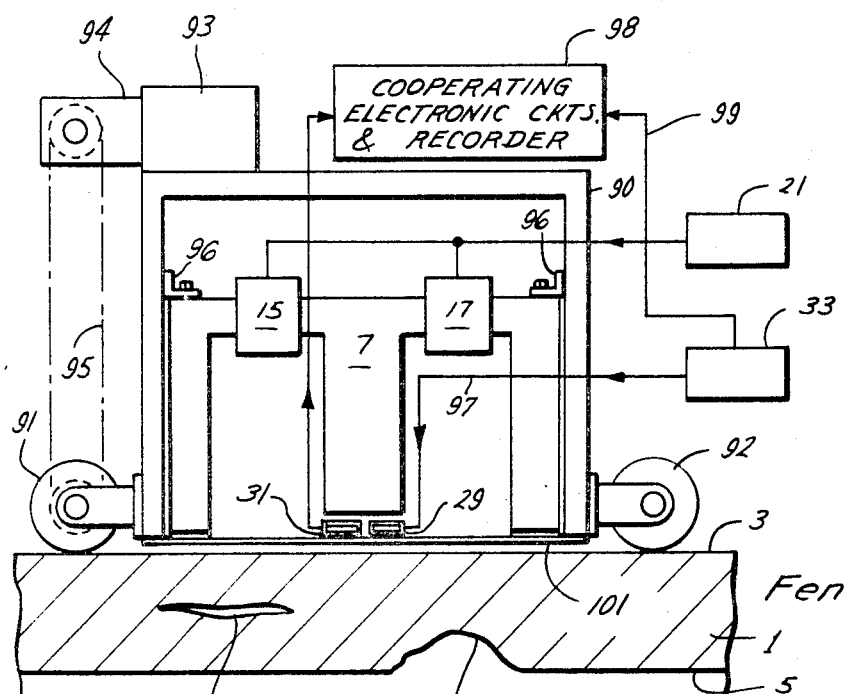

United States Patent Office 3,555,887
Patented Jan. 19, 1971

3,555,887
APPARATUS FOR ELECTROACOUSTICALLY INSPECTING TUBULAR MEMBERS FOR ANOMALIES USING THE MAGNETOSTRICTIVE EFFECT AND FOR MEASURING WALL THICKNESS
Fenton M. Wood, Sugarland, Tex., assignor to American Machine & Foundry Company, New York, N.Y., a corporation of New Jersey
Filed Sept. 19, 1967, Ser. No. 668,793
Int. Cl. G01n 9/24, 29/00
U.S. Cl. 73—67.5                            4 Claims

ABSTRACT OF THE DISCLOSURE

An electroacoustical inspection apparatus is provided for making wall thickness measurements and/or for discovering and locating anomalies. This apparatus includes generally means for establishing a DC magnetic field in the wall of an inspected member, pulsing means for varying this field at a high frequency to produce an acoustic wavefront in the wall (or alternately, creating in an appropriate modulating means located near the wall a high frequency, high power magneic field directed toward the wall), and sensing means for detecting the variations in the established magnetic field affected by the magnetostrictive effect of the wall by the wavefront. Included in the preferred embodiment of the pulsing means is a transmitting transducer comprising a series of coils in which a traveling wave is generated by a cyclical or pulsed wave source. By such action, the angle of incidence of the entering wavefront may be established as well as the propagation direction through the material being examined for wall thickness and for flaws. Suitable detecting and indicating means connected to the sensing means may be provided to detect variations in the magnetic field which are caused by high frequency reflected mechanical vibrations which are an indication of back surface reflections and of the presence of flaws. Suitable calibration means, such as an oscilloscope or phase comparator, is provided to measure the travel time and magnitude of the returning wave as a measure of wall thickness of the inspected member or flaw location.

---

This invention relates broadly to apparatus and method for inspecting ferromagnetic members and more specifically to such inspection utilizing principles effecting optimum inspection of walls of tubular members for wall thickness and for anomalies that respond to the magnetostriction effect, all without requiring physical coupling between transducers and the tubular members.

Ultrasonic inspection using pulse-echo techniques for inspecting ferromagnetic and non-ferromagnetic castings, plates and tubes have been used for a number of years. In the early years of development of ultrasonic inspection apparatus, it was necessary to cement quartz piezoelectric elements used as the transmitting and receiving transducers to the surface of the material being inspected (e.g., Firestone 2,280,226). Later, other types of acoustic couplings were developed to achieve the necessary junction between the transducer elements and the surface of the inspected member. For instance, oil or grease coupling is described in Smoluchowski 2,460,153; point contact coupling is described in German Pat. 569,673 and British Pat. 732,083; and rubber or pliable coupling is described in Meunier 2,532,507, Bond 2,602,327 and French Pat. 1,065,907.

The most universally successful of these prior art coupling techniques is the water coupling technique. But, in spite of its effectiveness in some applications, many disadvantages have been observed with water coupling. For example, water will not wet or effectively acoustically couple with an oily surface. Water, when used on a heated surface, can cause undesirable metallurgical effects and will create steam (with the accompanying pressure and bubble effects that necessitate special handling). Water (and for that matter other fluid coupling mediums as well) is incapable of reliably coupling through loose mill scale or through coatings which are delaminated or otherwise non-adhering. Finally, supplying clean water in oilfield down-hole work (for the inspection of casing) has a "killing" effect on the drilling mud. And, using the mud itself as a medium is at best uncertain, since the heavy mud tends to scatter and greatly attenuate ultrasonic frequencies introduced from conventional transducers.

Heretofore no known commercial apparatus existed using ultrasonic waves, particularly L-waves, for measuring wall thickness which uses no acoustic coupling medium whatsoever. Furthermore, not only does the herein described apparatus and method afford ultrasonic wall thickness inspection via a dry coupling technique, but anomaly inspection is provided using the magnetostriction effect, as well. The development of such a technique, as herein described, makes it possible to achieve inspection at high velocity relative translation (inspected member with respect to the inspection equipment), particularly in the inspection of both the inside sufaces and the outside surfaces of pipe. Moreover, the technique herein described may be successfully employed in the presence of heavy drilling mud more effectively than with the heretofore employed conventional transmitting and receiving transducer of the piezo-electric crystal type.

Before describing the particular preferred embodiments of the apparatus, a general description of the phenomena and the general method of utilizing the magnetostriction effect should be first considered. When a tube made of a ferromagnetic material is subjected to a direct current magnetic field, it is well known that the dimension of the tube changes by a very small amount. This phenomenon, or magnetostriction effect, is more completely described in "Ferromagnetism" by Bozorth, published by Van Nostrand Company, p. 677. In essence, however, upon the introduction of a magnetic field there is a stressing or straining of the material that causes the change in the dimension of the pipe. Conversely, when the pipe is subjected to a strain or stress, external to this field, such strain or stress increases or reduces the intensity of the magneitc field by a small amount, as is more completely described on p. 598 of Bozorth, supra. The amount of intensity change in the magnetic field caused by such stressing or straining (in addition to the dimension change caused by the rigidity of the material and the magnitude of the force effecting the change) depends on the portion of the magnetostrictive curve being employed for the inspection. That is, a change may be small or great, depending partly at the place on the curve related to the magnetic field and the material of the inspected member to which the field is applied. The steeper the curve, the greater is the effect.

The apparatus ingeniously utilizing the above described phenomenon which is described hereinafter in detail for making wall thickness measurements in such members as a ferromagnetic pipe generally comprises a means for establishing within the pipe wall a DC magnetic field approximately normal thereto and which is at an intensity level where the field is approximately at the steepest portion of the magnetostrictive curve, a modulating means disposed within the established field that alternately increases and decreases the established field, thereby producing a pulsating magnetostrictive effect at the first surface of the material, the pulsating magnetostrictive effect at the first surface in turn generating acoustic waves that propagate through the wall and are reflected from the second surface thereof. The apparatus further includes sensing means preferably including a sensing coil located in the established field for detecting variations in the magnetic field strength caused by the reverse magnetostrictive effect produced at the first surface by reflections of the acoustic waves from the second surface of the pipe wall. Detection means are coupled to the coil for measuring the elapsed time of the acoustic waves propagating from and reflected back to the first surface of the pipe wall to provide an indication of wall thickness.

Alternate to the modulating means being located in the established DC magnetic field is a high frequency, high power electromagnetic transducer located adjacent but slightly spaced apart from, the surface of the inspected member, but not within the field. This causes the desired acoustic signal to be imparted into the inspected member. In practice, it has been found that the use of a modulating means located within the DC magnetic field is the more preferred.

A phase shift measuring means may be employed in place of the elapsed-time measuring means.

Similarly, apparatus is also described hereinafter in more detail for detecting the presence of an anomaly.

It should be noted that the equipment described herein may be all disposed at a spatial distance from the near surface of the pipe wall and does not require a coupling medium. Also, even an unclean surface having a great deal of mill scale or an environment of heavy drilling mud will not interfere greatly with the operation.

Moreover, since the two apparatuses generally described above are substantially identical, the same apparatus may be employed for making simultaneous wall thickness and anomaly indications, if desired.

Finally, if the modulating means (including the means for determining the direction of the introduced acoustic wavefront) has a plurality of coils separated by delay lines, then a directional wavefront may be introduced into the material so as to facilitate the disposition of the sensing means, such as a sensing coil, thereby ensuring the receipt of the meaningful reflected signals at the location where their strengths are the greatest and so that the transmitted signals interfere to the minimum extent with these reflected signals.

It is therefore readily apparent that one feature of the apparatus is to provide an improved means for inspecting a ferromagnetic plate or sheet, such as the wall of a pipe, using no coupling medium, but which also is not materially hindered by the presence of non-ferromagnetic substances such as drilling mud.

Another feature is to provide an improved means for inspecting a ferromagnetic plate or sheet, such as a wall of a pipe for both thickness and anomalies, the means needing no coupling medium, but which also is not materially hindered by the presence of non-ferromagnetic substances such as drilling mud.

Still another feature of the invention is to provide an improved flaw detection apparatus which utilizes the change in frequency caused by the magnetostrictive effect normally in conjunction with wave filters to assist in isolating the received signal from the transmitted signal.

So that the manner in which the above-recited advantages, objects and features of the invention, as well as others which will become apparent, are attained can be understood in detail, more particular description of the invention briefly summarized above may be had by reference to the embodiments thereof which are illustrated in the appended drawings, which drawings form a part of this specification. It is to be noted, however, that the appended drawings illustrate only typical embodiments of the invention and are therefore not to be considered limiting of its scope, for the invention may admit to other equally effective embodiments.

In the drawings:

FIG. 1 is a plan view of a physical layout of one preferred embodiment of the apparatus described herein.

FIG. 2 is a schematic representation of one preferred embodiment of the invention described herein.

FIG. 3 is a partial view of the wave pattern occurring in an inspected article as established by one embodiment of the invention.

FIG. 4 is a partial view of the wave pattern occurring in an inspected article as established by another embodiment of the invention.

FIG. 5 is a top view of one arrangement of transmission and sensing coils in accordance with the invention.

FIG. 6 is a waveform diagram indicating how wall thickness measurements may be made in accordance with the invention.

FIG. 7 is a schematic representation of another embodiment of the invention described herein.

FIG. 8 is a physical layout of another preferred embodiment of the apparatus described herein.

Figure 9:
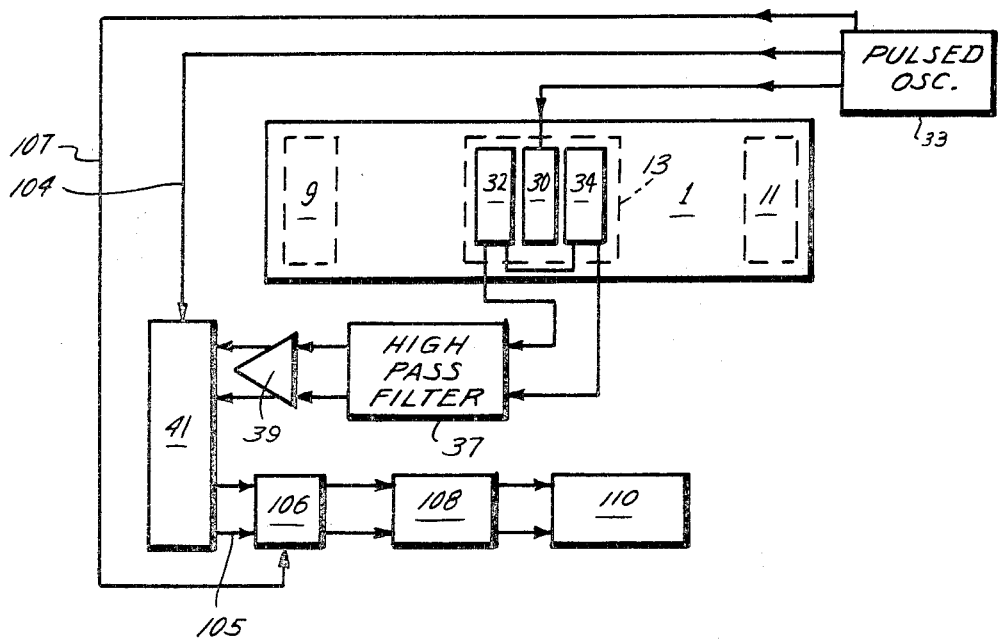
FIG. 9 is a schematic representation of another embodiment of the invention described herein.

Now turning to the drawings, and first to FIG. 1, a ferromagnetic tubular member 2, such as an ordinary joint of transmission pipe, is shown by any convenient manner being supported by and translated by rollers 4 past an inspection station 6 in a direction 8. Connected by electrical cable conductors 10 in a conventional manner is a control and display console 12. Located in console 12 may conveniently be located the necessary power apparatus, and electronic hardware to be more fully described below. Located at inspection station 6 through which the tubular member is translated is the magnetizing, modulating and sensing means to be described later and which is illustrated in more detail in the subsequent figures.

Now turning to FIG. 2, a segment of a pipe wall 1 of tubular member 2 is shown in cross-section having a near surface 3 (closest to the inspection apparatus) and a far surface 5. Disposed opposite near surface 3 is an E-shaped iron core 7 of an electromagnet, the iron core being made of a high permeability material. Iron core 7 includes two distal poles 9 and 11 and a center main pole 13. Wrapped respectively about distal poles 9 and 11 are bias field coils 15 and 17.

At inspection station 6, iron core 7 is maintained in relative position with respect to the moving tubular member so that distal poles 9 and 11 maintain a relatively constant magnetic field therethrough and through main pole 13, which may be thought of as part of a return path to the distal poles.

Coils 15 and 17 are connected in series by a connection 19 and to a DC bias field power supply 21 by connections 23 from coil 15 and connection 25 from coil 17. Located in series with the circuit loop just described, for example in connection 25, is a variable resistor 27 for adjusting the amount of current flowing through the coils and, hence, the strength of the magnetic field established by the apparatus just described.

Main pole 13 is located preferably midway of distal poles 9 and 11 and is made somewhat shorter (end is located further from surface 3 than the ends of the distal poles) so that it can accommodate certain elements between the pole and surface 3 of pipe wall 1, to be described. Also, main pole 13 is broader than the distal poles so that the established magnetic field which passes through main pole 13 may be shared substantially equally by each of distal poles 9 and 11.

The strength of the magnetic field is determined by the thickness and material permeability of pipe wall 2. It is most advantageous to establish or bias the strength of the field in the pipe wall under pole 13 at the point on the magnetostrictive curve where the curve has the steepest characteristics. This is not a requirement for operability, but to achieve the greatest effect for optimumly detecting the presence of anomalies, the strength of the field should be set in this manner.

It should be noted that the magnetic field that is established through main pole 13, and through the elements located between pole 13 and surface 3, is substantially normal to surface 3. This field also preferably is substantially uniform under the area of pole 13. Assuming that the cross-sectional view shown in FIG. 2 is a longitudinal cross-section of wall 1 of ferromagnetic pipe, it may be seen that the surface of the end of main pole 13 disposed adjacent surface 3 and through which the field is established is substantially parallel to surfaces 3 and 5 of wall 1.

Located underneath one longitudinal extremity of pole 13 is a transmitting transducer 29, to be described more fully hereinafter, and located underneath the opposite longitudinal extremity of pole 13 is a receiving transducer 31, which is most conveniently one or more turns of a coil, the plane defined by the coil preferably being substantially parallel to surface 3. For convenience of illustration, a schematic looping is shown, but the actual appearance of the coils is physically more nearly accurately illustrated in FIG. 5. Sensing coil 31 may be spiral, rectangular or any other convenient configuration. Transmitting transducer 29 may also merely be coil turns of a similar structure to coil 31, although if desired, as will be discussed, this transducer takes on a different character.

Connected to transmitting transducer 29 is a pulsed oscillator 33 for producing very short pulses having sharp cut-off characteristics. Typically, the repetition rate of the pulses produced from pulse oscillator 33 are produced between 60 and 2,000 pulses per second and are on the order of one microsecond long. The power generated through the transducer for each of the pulses may be on the order of 50 kilowatts, although a power as low as 500 watts has been found to be usable. Since the sharp cut-off characteristics are optimumly obtainable with a low impedance coil, the produced current from the pulsed oscillator is high.

Pulse oscillation to a transducer located underneath the main pole through which a DC magnetic field has been established produces a modulation of that magnetic field which alternately increases and decreases about a nominal value. In effect, the modulated magnetic field when incident at surface 3 produces a magnetostrictive effect at the surface of the ferromagnetic material of wall 1, and in turn the magnetostrictive effect generates an acoustic wavefront of conventional character which propagates transversely through the wall of the pipe.

The expansion and contraction of the material of wall 1 by the magnetostriction effect will cause wall 1 to "vibrate" at substantially the same frequency as the modulating frequency which drives transducer 29. The traveling acoustic wavefront will be reflected off far surface 5 to be returned at surface 3. When the acoustic wavefront is reflected back to surface 3 that surface vibrates and gives rise to the reverse magnetostrictive effect which modulates the DC field. The transducer 31 which is disposed in the magnetic field then senses the modulated magnetic field.

The signal developed by transducer 31 is converted to electrical energy and transmitted on connectors 35 to suitable detecting and indicating means. For example, a high-pass filter 37 may be used to remove the existing low frequency noise signals that may otherwise interfere with the meaningful reflected signals. Of course, if desired, the sensing and detecting means may be tuned to a harmonic frequency of the pulsed oscillator, rather than the fundamental frequency, thereby facilitating filtering even more.

The output from the high-pass filter may be connected to an amplifier and detector circuit 39 of conventional design for producing a suitable signal which may be used to drive an indicator, such as oscilloscope 41. Also, marking or kick-out devices could be operated in addition to or instead of oscilloscope 41.

FIG. 3 shows a detail of the action which occurs during inspection, such as in a wall thickness measurement. The transmitting means, illustrated as transmit coil 30, produces an emanating series of acoustic waves which fan out from a point substantially directly underneath coil 30. The reflected waves, following contact with far surface 5, return to near surface 3 and in the manner described above cause the DC magnetic field to be modulated. The modulated field is sensed by a sensing coil that is positioned alongside transmit coil 30. Since the center of the emanating wave travels substantially normal to the surface fanning out in both directions, sensing coils may be located on either side of the transmit coil, or both. Appropriately located sensing coils 32 and 34 are shown to receive reflected waves via paths 36 and 38, respectively.

It should be recognized that the angle of emanation and reflection is such that they are not exactly normal to the material surfaces and therefore do not represent an absolutely proportional thickness measurement. However, the slight variation from an absolutely directly proportional measurement is readily tolerated for almost all applications.

An alternative to the configuration of transducer 30 shown in FIG. 3 is the transducer shown in FIGS. 4 and 5. As there shown, transducer 29 comprises a succession of substantially identical coils 47, 49, 51 and 53, each coil including one or more turns. For maximum efficient transmission, the plane of each coil defined by the coil sides is parallel with the surfaces of pipe 1.

The successive coils of the transducer are connected together via successive delay means, such as inductor coils 61, 63 and 65. End coil 47 is connected to pulsed oscillator 33 via ends 55 and 57. It should be noted that the entirety of the coil configuration comprising coils 47, 49, 51 and 53 (but not necessarily inductor coils 61, 63 and 65) is located underneath one end of pole 13 and therefore within the established magnetic field.

With the coils being positioned within the established DC magnetic field, the resulting frequency of the acoustic energy established in the material is the same as the modulating frequency produced by the pulsed oscillator. If the transducer coils are placed outside the limits of the DC magnetic field, an acoustic energy wave will still be established in the material, but in this event the frequency of the wave will be twice the frequency produced by the pulsed oscillator. In either event, the frequency will be at a sufficiently high frequency to be filterable from ordinary interfering noise. Hence, "high frequency" as used herein only means a sufficiently high frequency to be above ordinary 60 Hertz noise.

Notice also that in the top view (FIG. 5) of the arrangement of coils shown in FIG. 4, the successive coils of transducer 29 are nestled as closely together as possible, the lead-in being conveniently brought out for connection to the various delay means (e.g., inductor coils previously mentioned). Sensing coil 31, although still within the area limits of pole 13, is not necessarily nestled close to the transmission coils, but is rather most advantageously positioned to optimumly receive the reflected or returned signals emanating from surface 3.

In addition, FIG. 5 shows a delay line structure utilizing both inductor coils and capacitors, if desired. Conveniently, a capacitor 59 is connected across each successive coil and inductors 60, 61 and 63 are connected successively across first leads of coils 47, 49, 51 and 53. A capacitor is connected across the leads of coil 53. The second lead of coil 53 is connected to ground and to the second lead of each of the other transmit coils. Input to this arrangement is then applied across ground in a common connection of the second leads of coils 47, 49, 51 and 53.

In effect, the inductor (with capacitors, if desired) and transmit coil configurations form a succession of drive and delay circuits so that a signal which is produced from the pulsed oscillator is applied to transducer 29 on input connections 55 and 57 and causes a variation in established DC magnetic field initially at the end of pole 13 where coil 47 is located. The traveling wave which results in coil 47 next is produced in coil 49, which is at the next coil position from coil 47. Hence, magnetostrictive effects are caused at a slightly later time in the surface 3 of pipe 1 opposite coil 49 than opposite coil 47. Likewise, magnetostrictive effects successively occurs opposite coils 51 and 53.

The operation of rippling one pulse after another along the successive transmission coils in the manner just described has a reinforcing effect upon the magnetostrictive effect vibrations establishing in pipe 1 and, hence, on the established DC magnetic field. This produces a wavefront 67 which is at an angle 69 to surface 5 of the material. This angle is determined by the amount of delay which is represented by the circuit just described. It is desirable to make the angle steep enough with respect to surface 3 so that the effective direction of travel of reflected wavefront 71 is optimumly directed at sensing coil 31, as previously described also located underneath pole 13, preferably at or near the end opposite from the location of transducer 29.

By establishing the wavefront in the manner just described, only one set of effective waves is produced in the material, rather than a plurality. That is, the plurality of initiated waves underneath each transmission coil blend together to form a single established wavefront traveling at an angle with respect to the surface.

Each of the plurality of pulses included in the signal which is sensed by a properly positioned sensing coil, such as coil 32 or 34 in FIG. 3, or coil 31 in FIGS. 4 and 5, is typically shown in FIG. 6. There is an initially received relatively broad wave 40 that is sensed by the sensing coil through direct coupling with the transmission coil or coils. This initial wave of the signal, after a period of time, decays to be essentially a zero value, until the time that the reflected or returned wave 42 is sensed. Normally, this return wave 42 will be on a lower order of magnitude than the initial transmission wave 40.

The shape of the received wave is such that time, and hence wall thickness, measurements are readily made with respect to the occurrence of the initial transmission wave. With respect to wave 42, notice first that the leading edge of this reflected wave rises very sharply, thereby establishing a point 44 shortly after its initial rise that could be detected by an amplitude level detector. The time 46 between the initiating of wave 40 and this point 44 is a measure of wall thickness.

Alternately, wave 42 peaks at a very discernible point, unlike wave 40. This peak is also a readily discernible indicated point. Therefore, time 48 between the leading edge of wave 40 and the peak of wave 42 may also be calibrated as an approximate measure of wall thickness.

Following the receipt of wave 42, there continues to be a certain amount of ringing, as shown in the waveform of FIG. 6. Once the meaningful initial time measurement has been made, the ringing decays to such an extent that it has no effect on the associated electronic circuit and, hence, effectively no effect on the subsequent time measurement pulse signal. If it is desirable to put the pulses closer together, through gate circuitry or otherwise, the ringing of each pulse may be damped so that the ringing of one pulse will not interfere with the subsequent pulse measurements.

FIG. 7 shows a schematic representation of a wall thickness inspection circuit that may be employed together with an anomaly detecting circuit to accomplish both types of inspections, common components carrying identical reference numbers as in FIG. 2.

Shown in FIG. 7 is the main pole 13 of an electromagnet 7, a transmitting transducer 29, which is preferably of the same type as shown in FIG. 4 (although a simple coil arrangement may also be employed), and a receiving transducer 31. Disposed between transmitting and receiving transducers 29 and 31 is a shield 75 for preventing signals emanating from transducer 29 from being directly received through coupling by transducer 31, rather than being reflected from the material. Connected to transducer 29 is a pulsed oscillator 33, similar to that which is shown in FIG. 2. Included in the connection between pulsed oscillator 33 and transducer 29 is a variable resistance 77 which acts as a load and which may be used to develop a signal for comparison purposes on conductors 79, to be more fully described.

In any event, the pulse signals which are produced by oscillator 33 and which cause a pulsing of the established magnetic field through pole 13 will cause a reflection off near surface 3 which will be received by receiving transducers 31 in the absence of a shield 75 therebetween. After a period of time, the same signal will be reflected off surface 5 to also be received by receiving transducers 31.

A circuit calibrated to indicate wall thickness (distance between surfaces 3 and 5) may be connected to the output of transducer 31. Even an oscilloscopic display for presenting the FIG. 6 signal may be used. Such a circuit effectively measures the travel or transit time for the acoustical wavefront to pass from the near surface to the far surface and back to the near surface.

More suitable indicator means includes a phase detector circuit 81 which receives two inputs, one from receiving transducer 31 and the other from connection 79 (effectively, the output from oscillator 33). At the time that a signal is produced from oscillator 33 and transmitted over connection 79 to phase detector 81, a signal is produced into wall 1 from transmitting transducer 29. If shield 75 is made sufficiently close to the material and if the spacing between transducers 31 and 29 is such that the near surface reflections cannot be received directly, there will be no indication at transducer 31 until the far surface reflection is received. By comparing the distance between the signal received on line 79 and the signal detected by receiver 31 (the signal reflected off surface 5), an indication of wall thickness is made.

If oscillator 33 produces a continuous wave, rather than a string of pulses, the phase detector would in truth measure the phase difference or phase shift between the signal on line 79 and the signal from receiving transducer 31, rather than the time between pulses, as an indication of wall thickness.

The occurrence of a reflecting surface which is not a back surface reflection will be indicated by the abruptness of appearance and presence of a back surface reflection as well. All of this is measurable by an appropriate phase meter and capable of being indicated on a subsequent indicator.

Instead of using a bias magnet, the biasing DC current for establishing an effective magnetic field of approximately uniform strength may be passed through the coils operating as the transmitting and sensing coils along with the high frequency pulses or high frequency continuous wave in the manner described above. By selecting the correct DC current, operation on the desired slope of the magnetostrictive curve may be achieved.

Also, a Hall detector may be substituted for the sensing coil, provided the established bias DC magnetic field passes simultaneously through the Hall detector and the wall of the inspected member, such as shown for a sensing coil in FIGS. 2 and 4.

The equipment that has been described has been characterized mostly in terms of stationary equipment through which a tubular member is translated. However, it should be recognized that the equipment may be just as effectively operated were it mounted on a carriage which is translated past a stationary pipe. Such an arrangement is shown in FIG. 8, where carriage 90 is mounted for movement over pipe 1 via attached drive and support wheels 91 and 92 mounted on either side thereof. Drive is provided through motor 93, appropriate gear mechanism 94 and drive chain 95. Secured within carriage 90 by bolts 96 is E-shaped bias magnet 7 having wound about its respective distal ends bias coils 15 and 17, in the manner as with the apparatus shown in FIG. 2. DC bias field power supply 21 is connected to the bias coils. Pulsed oscillator 33 is attached to transmission transducer 29 via conductor 97 and to cooperating electronic circuits and recorder 98 via conductor 99, similar to the connections shown in FIG. 7. Sensing means 31 is also connected to circuit 98, as with the other apparatus previously discussed. Across the bottom of carriage 90 protecting the components carried therein is shim 101. The entire apparatus detects changes in wall thickness, such as at internal wear spots 102 and inhomogeneous spots 103, as with the equipment previously discussed. Notice also the shim 101 is preferably quite wear-resistant and of a nonferromagnetic material with a high resistivity so as to wear well and also to prevent eddy currents in the shim from reducing the total modulation in the field. Suitable shim and sensing coil structures are shown in Lloyd Pat. 2,650,344 and in Price Pat. 2,685,672.

Also, the equipment has been assumed to be mounted adjacent the outside surface of the pipe. The equipment instead may be embodied within a pig-mounted equipment for translation with respect to the inside of the pipe. Also, of course, the equipment may be embodied for translation via a cable, such as with respect to a casing in a down-hole operation.

As previously mentioned, a plurality of sensing coils could be used in conjunction with a single transmitting transducer, as shown in FIG. 3. A more complete arrangement is shown in FIG. 9. Here, a top plan view is shown, distal ends 9 and 11 and center pole 13 being shown in dotted lines and positioned over pipe 1. Transmission coil 30 is centrally located underneath pole 13, and sensing coils 32 and 34 are shown also under pole 13 on either side of pole 30, as was shown in FIG. 3.

A pulsed oscillator 33 is used, as before, to excite transmitting coil 30. Sensing coils 32 and 34 are disposed to receive return reflections substantially simultaneously. These coils are connected together and in succession to filter 37, amplifier 39 and indicator equipment, such as oscilloscope 41, as before. A synchronizing signal 104 from oscillator 33 may be used for determining the sweep re-set time for the oscilloscope.

From oscilloscope 41, if desired, an output 105 may be taken for application to a flaw gate circuit 106 enabled by a delay signal 107 from oscillator 33. If there is a reflected response abnormally soon (indicating either a thin spot in the wall or the presence of a reflecting inhomogeneity) gate 106 would allow such signal to pass therethrough. At the time of an occurrence of a normal wall thickness return, gate 106 would be shut off by delay signal 107 from oscillator 33.

To prevent a stray signal from a single pulse from being unduly alarming, the output from gate 106 is connected to integrator 108 and associated circuits of conventional design to produce an output only after a repeated series of pulses indicates the abnormality. If desired, this indication from integrator 108 may be recorded by a suitably synchronized recorder 110 to make a permanent record of the abnormality for later trouble-shooting and correction.

It should also be noted that although FIG. 9 shows only one transmit transducer interspaced between two sensing means, sequential positioning of a plurality of transmit transducers and sensing means could be located under pole 13 for a broader inspection coverage.

It has previously been mentioned that the exciting wave 40 from oscillator 33 is broad and could potentially flood out wave 42 if time 46 were short enough. (See FIG. 6.)

Figure 10:
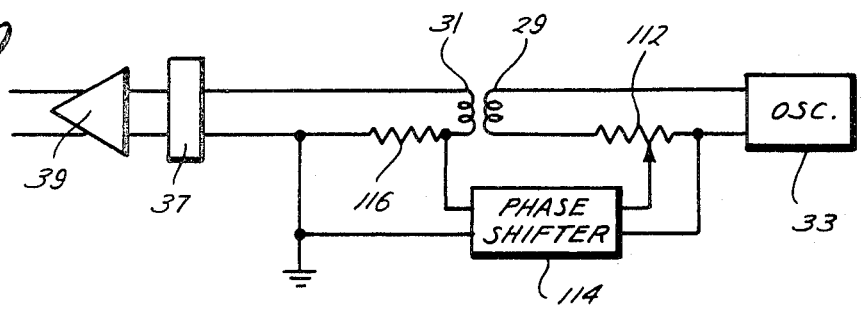
FIG. 10 is a compensating network for minimizing the effects of direct coupling between transmission and sensing coils in one embodiment of the invention.

To prevent this overdriving of the sensing means from happening, shield 75 could be inserted. (See FIG. 7.) Also or alternately, if desired, a circuit such as shown in FIG. 10 could be employed. Here, a sample of the exciter current used to drive transducer 29 from oscillator 33 is taken by potentiometer 112 and applied to RC phase shifter 114. The output from phase shifter 114 is applied to a resistor 116 in the output circuit of sensing coil 31. The phasing is adjusted to oppose or phase out by cancellation most of the directly coupled modulation signal between the excited coil or coils of transducer 29 and sensing coil 31. The sensing of the reflected wave is left unaffected.

Figure 11:
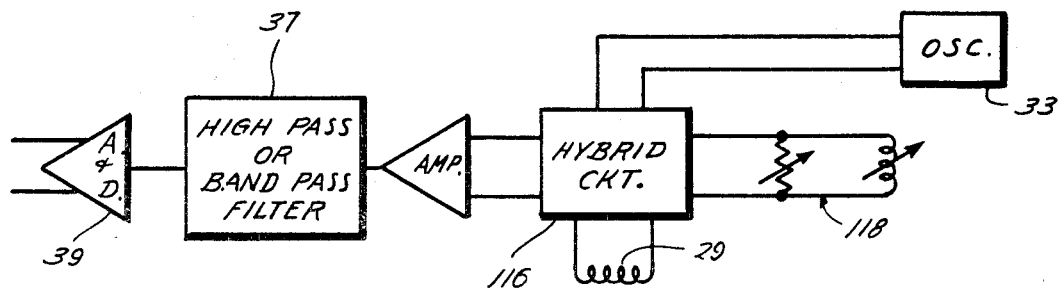
FIG. 11 is a hybrid circuit arrangement which may be used between transmission and sensing coils in the present invention.

Similarly, a hybrid arrangement as shown in FIG. 11 may be used to minimize the exciting signal entering the sensing coil amplifier. A typical hybrid circuit as used in telephone circuit applications may be used, as exemplified in Hearn Pat. 2,144,843. Such an arrangement includes a hybrid circuit 116, connected to a variable dummy load and, in this instance, sensing coil 29 (which is reflected in the hybrid circuit as a combination of the exciting coil or coils 31).

It should be further noted that only one frequency of a driving oscillator for the transmitting transducer has heretofore been discussed. Actually, driving the transmitting transducer at a plurality of oscillator frequencies is possible to produce in the receiving or sensing transducers various combinations of frequencies. The advantage of this is that certain modulation products are easier to filter and detect, since they are further away from the fundamental of the modulation frequencies.

Also, as shown in FIG. 5, if desired, a resistor 120 may be placed in parallel with coil 53 to dissipate reflections in the delay line so that traveling waves will not return in the opposite direction from that which is intended.

Finally, because it may be desirable not to have an output voltage when there is no pipe wall present in the inspection area, it is possible to include in the transmitting means coil arrangement and/or the sensing means coil arrangement turns of coils (or a connection between coils within a means) that are in series opposition connection. A suitably operable circuit is discussed in "Method of Maximizing and Controlling the Gain of a Sonic Delay Line," Joseph L. Riley, IREE Transactions on Sonics and Ultrasonics, July 1967, page 115.

While several embodiments of the invention have been described, it is obvious that various additional substitutions or modifications of structure may be made without varying from the scope of the invention.

What is claimed is:

1. Apparatus for inspecting the wall of a member having first and second spaced wall surfaces, said member being capable of exhibiting the magnetostrictive effect, comprising:

means spaced from and adjacent said first surface for directing a magnetic field transversely into said first surface to magnetize said wall, means for modulating the strength of the transversely directed magnetic field to cause acoustic waves to be generated at said first surface by the magnetostrictive effect, said acoustic waves propagating transversely through the wall of the member and being reflected back to said first surface where they produce the reverse magnetostrictive effect, said reverse magnetostrictive effect producing a modulation of the transversely directed magnetic field, and means comprising a flat coil spaced from and adjacent said first surface and disposed parallel thereto in said transverse magnetic field for sensing the modulation of the field caused by the reverse magnetostrictive effect.

2. Apparatus for inspecting the wall of a member having first and second spaced wall surfaces, said member being capable of exhibiting magnetostrictive effect comprising:
- means spaced from and adjacent said first surface for directing a magnetic field transversely into said first surface to magnetize said wall,
- a plurality of closely adjacent flat coils spaced from and adjacent said first surface,
- means for sequentially exciting said coils with a modulating signal to modulate the strength of said transversely directed magnetic field to cause acoustic waves to be generated at said first surface due to the magnetostrictive effect,
- said acoustic waves propagating transversely through the wall of the member and being reflected back to said first surface where they produce the reverse magnetostrictive effect, said reverse magnetostrictive effect producing a modulation of the transverse magnetic field, and
- means spaced from and adjacent said first surface and disposed in said transverse magnetic field for sensing the modulation of the field caused by the reverse magnetostrictive effect.

3. Apparatus for inspecting the wall of a member having first and second spaced wall surfaces, said member being capable of exhibiting the magnetostrictive effect comprising:
- an E-shaped magnet means having two distal poles and a center pole, said poles being positioned adjacent said first surface for establishing a DC magnetic field in the wall of the member,
- means spaced from an adjacent said first surface for producing a transversely directed magnetic field of varying strength which is directed into said first surface thereby to cause acoustic waves to be generated at said first surface by the magnetostrictive effect,
- said acoustic waves propagating transversely through the wall of a member and being reflected back to said first surface where they produce the reverse magnetostrictive effect, said reverse magnetostrictive effect producing a modulation of the transversely magnetic field, and
- means spaced from and adjacent said first surface and disposed in said transverse magnetic field for sensing the modulation of the magnetic field caused by the reverse magnetostrictive effect,
- said means for producing the varying strength magnetic field and the sensing means being disposed between said center pole and said first surface.

4. Apparatus for inspecting the wall of a member having first and second spaced wall surfaces, said member being capable of exhibiting the magnetostrictive effect, comprising:
- means spaced from and adjacent said first surface for directing a magnetic field transversely into said first surface to magnetize said wall,
- means comprising a flat coil disposed in said magnetic field and in spaced parallel relationship to said first surface for producing a transversely directed magnetic field of varying strength to modulate said first named magnetic field to cause acoustic waves to be generated at said first surface by the magnetostrictive effect,
- said acoustic waves propagating transversely through the wall of the member and being reflected back to said first surface where they produce the reverse magnetostrictive effect, said reverse magnetostrictive effect producing a modulation of the transversely directed magnetic field, and
- means spaced from and adjacent said first surface and disposed in said transverse magnetic field for sensing the modulating of the field caused by the reverse magnetostrictive effect.

References Cited

UNITED STATES PATENTS

| 2,401,094 | 5/1946 | Nicholson, Jr. | 324—69 |
| 2,656,714 | 10/1953 | Cartier | 73—67.8 |
| 3,226,976 | 1/1966 | Wood | 73—67.9 |
| 3,237,446 | 3/1966 | Wood | 73—67.9 |
| 3,436,958 | 4/1969 | Proctor | 73—67.9X |
| 2,280,226 | 4/1942 | Firestone | 73—67.8 |

OTHER REFERENCES

Fundaments of Acoustics, by Kinsler and Frey, John Wiley & Sons (1950), pp. 456–461.

RICHARD C. QUEISSER, Primary Examiner

U.S. Cl. X.R.

73—67.4